Oct. 21, 1958
G. PATTANTYUS
2,856,691
DEVICE FOR MEASURING THE LENGTH OF COILS OF
STRIPS OF UNIFORM THICKNESS
Filed May 17, 1955
Fig. 1
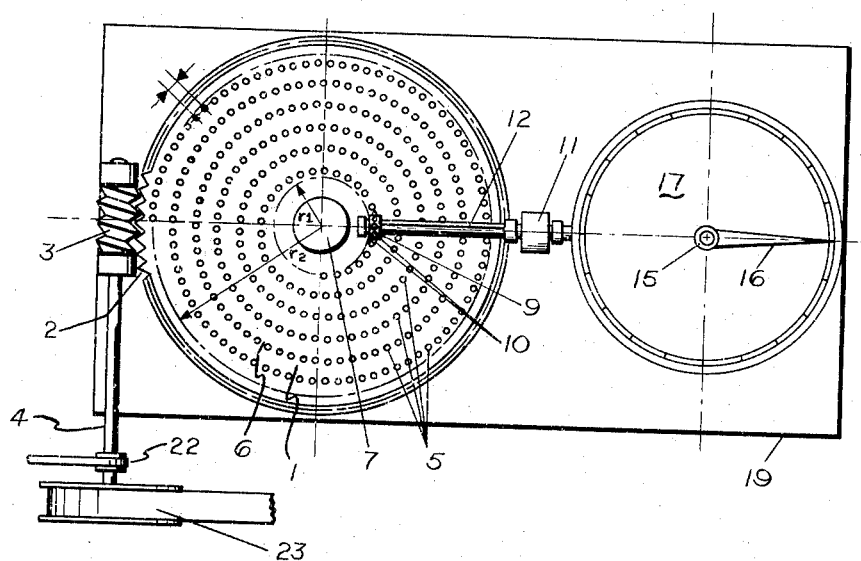
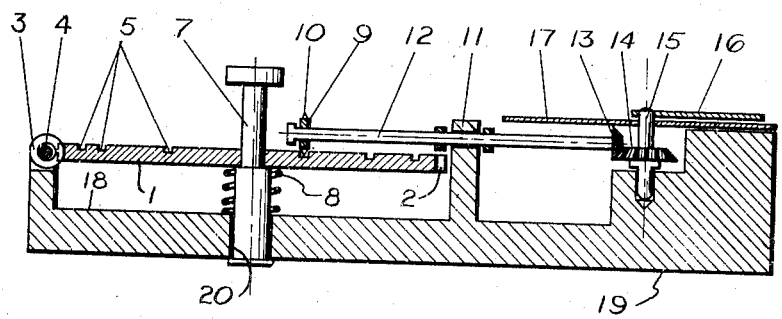
Fig. 2
INVENTOR
GEORGES PATTANTYUS
BY Toulmin & Toulmin
ATTORNEYS

United States Patent Office 2,856,691
Patented Oct. 21, 1958

2,856,691

DEVICE FOR MEASURING THE LENGTH OF COILS OF STRIPS OF UNIFORM THICKNESS

Georges Pattantyus, Lisbon, Portugal

Application May 17, 1955, Serial No. 508,985

Claims priority, application Germany May 31, 1954

6 Claims. (Cl. 33—127)

It is an object of the invention to provide a device for measuring the lengths of strips having uniform thickness with great exactitude when the same are wound up in a coil.

It is another object of the invention to provide a device of the aforesaid kind which is of simple construction and shows great accuracy in operation.

It is finally an object of this invention to provide a device as described above which can be manufactured in a simple and economic manner.

Devices for measuring coils of strips of uniform thickness are used for instance for measuring the length of tape in recording and play back apparatus in order to determine the total length of the strip that is wound up in a coil, as well as to find rapidly certain desired spots intermediate the ends of the strip. These devices serve furthermore for determining the distance of such a desired spot on the coil by units of length.

However, the field of application of the device according to my invention is not limited to sound recording tapes. This device can also be used anywhere where analogous conditions make it applicable such as in measuring film coils and the like. The hitherto known devices for the said purposes are usually complicated and have sensitive gear transmissions which give rather inaccurate results, or give only partial results from which the desired final result can only be obtained in a complicated manner through the use of tables, diagrams or the like.

In order to avoid the aforesaid drawbacks of the known measuring devices, the apparatus according to my invention is constructed in a simple manner. It comprises a disk which is driven by the reel bearing the strip to be wound up, or by a driving device for the aforesaid reel. The apparatus further comprises an axially displaceable wheel which is mounted on a shaft in spaced relation to the aforesaid disk. The wheel is actuated by the disk and is concurrently displaced radially in outward direction along the shaft. The wheel in turn drives the shaft on which it is mounted, and the shaft is in turn connected with an indicating means. The indicating means may be any one of a number of known types such as for instance a counting device, an indicating hand in connection with a calibrated scale or the like from which the units of length can be read directly in each case.

On the driving disk there are provided a number of perforations or bores evenly spaced from one another and located along a curve which is preferably of spiral shape. Cone-shaped pointed projections mounted on the displaceable wheel evenly spaced from one another are adapted to engage the bores on the driving disk. Thereby the wheel bearing these pointed protrusions is successively moved in outward direction in correspondence with the inclination on the spiral curve of the bores in the driving disk, during operation of the apparatus. This arrangement makes it possible to obtain a linear indication for the rotation of the driving shaft of the coil.

In a preferred embodiment of the invention the shaft bearing the wheel with its pointed protrusions actuates a rotary hand moving across a calibrated scale, the hand being actuated from the wheel shaft by means of a gear transmission.

In order to return the apparatus to its initial position the driving disk is devised retractably into a corresponding recess in the casing of the apparatus. It is thus possible to disengage the connection between a driving worm and the toothed periphery of the disk as well as between the disk and the projection-bearing wheel, so that the latter can again be returned to its innermost position and reengage the perforations along the spiral curve on the driving disk anew in starting position. The driving disk is brought into operational position by means of a spring and held therein or preferably urged against the projection-bearing wheel by means of light pressure from resilient means, such as a spring.

The several objects and advantages referred to above will become more apparent upon reference to the accompanying drawings, wherein:

Figure 1 shows a top view of the apparatus,

Figure 2 is a longitudinal cross section through the apparatus according to my invention shown in Figure 1.

Referring now to the drawings more in details and particularly to Figure 1, reference numeral 1 designates the driving disk having at its circumference a toothing or thread 2, which engages the worm 3. This worm 3 is mounted on shaft 4 which is for instance driven from the driving means 22 for the coil of strip wound up on a reel 23.

The disk 1 is rotatively mounted on the shaft 7 which shaft can be pressed downwardly through an opening 20 of the casing 19.

A plurality of bores 5 are arranged on the upper surface of disk 1 beginning from an innermost position near the shaft 7 outwardly in the form of a spiral curve 6.

Spring 8 urges disk 1 in upward direction against the wheel 9. This wheel 9 possesses a plurality of cone-shaped pointed projections 10 which engage the bores 5 in disk 1 during rotation and thereby displace the wheel 9 radially in outward direction in relation to the disk 1. The wheel 9 is mounted axially displaceable at one end of a shaft 12 which is in turn rotatably mounted in the bearing 11, forming part of the instrument casing 19.

During its rotation and axial displacement, the wheel 9 causes the shaft 12 to rotate. At its opposite end, shaft 12 bears a bevel gear 13 which engages another bevel gear 14 mounted on the shaft 15. This latter shaft actuates the hand 16 rotating over the scale 17.

By pressure upon the shaft 7 the disk 1 can be lowered into a recess 18 against the pressure of spring 8, and the cone-shaped projections 10 on the wheel 9 are thus disengaged from the bores 5 on the disk 1.

What I claim is:

1. An apparatus for measuring lengths of strips of even thickness wound up in a coil, comprising a disk, driving means for actuating said disk at a determined ratio together with the rotation of said coil, a rotatable shaft arranged in substantially radial direction above said disk and restrained against axial movement, a wheel non-rotatably mounted upon said shaft and in rolling engagement with the surface of said disk so that rotation of said wheel upon said disk will cause said shaft to rotate, said wheel being axially displaceable on said shaft, said wheel being displaceable radially outwardly on said shaft in relation to said disk, said shaft moving a pointer over a calibrated scale.

2. An apparatus for measuring lengths of strips of even thickness wound up in a coil and comprising a disk, said disk being provided on its surface with a plurality of uniformly spaced bores, said bores being arranged on said disk to form a spiral-shaped curve, means for actuating said disk at a predetermined ratio together with the rotation of said coil, a wheel, cone-shaped protrusions around the rim of said wheel with said protrusions engaging said bores on said disk, a shaft arranged in substantially a radial direction above said disk, said wheel being displaceable on said shaft in an axial direction to move radially outwardly on said shaft with respect to said disk, a calibrated scale, and a pointer movable by said shaft over said calibrated scale.

3. An apparatus as described in claim 1, and further comprising a rotative pointer and a calibrated scale, and a transmission for drivingly connecting said shaft with said pointer.

4. An apparatus for measuring lengths of strips of even thickness wound up in a coil and comprising a disk, driving means for actuating said disk at a determined ratio together with the rotation of said coil, said driving means comprising a worm, a wheel, a rotatable shaft arranged in substantially a radial direction above said disk and restrained against axial movement, said wheel being displaceable on said shaft in an axial direction to move radially outwardly on said shaft with respect to said disk, a calibrated scale, a pointer movable by said shaft over said calibrated scale, a casing, there being a recess in said casing whereinto said disk may be retracted, a spring urging said disk out of said recess into operating position, said disk being provided with toothed segments around its periphery, said worm engaging said toothed segments for rotating said disk.

5. An apparatus for measuring lengths of strips of even thickness wound up in a coil and comprising a disk, said disk being provided on its surface with a plurality of uniformly spaced bores, driving means for actuating said disk at a predetermined ratio together with the rotation of said coil, a wheel having cone-shaped protrusions provided around its rim, said protrusions engaging said bores on said disk, a shaft arranged in substantially a radial direction above said disk, said wheel being displaceable on said shaft in an axial direction, a calibrated scale, and a pointer movable by said shaft over said calibrated scale.

6. In an apparatus for measuring lengths of strips of even thickness wound up in a coil, a disk, driving means for actuating said disk at a predetermined ratio together with the rotation of said coil, said driving means comprising a worm, said disk being drivingly connected with means for moving a pointer over a calibrated scale at a ratio determined by the moving of said strips, a casing, there being a recess in said casing whereinto said disk may be retracted, a spring urging said disk out of said recess into operating position, said disk being provided with toothed segments around its periphery, said worm engaging said toothed segments for rotating said disk.

References Cited in the file of this patent

UNITED STATES PATENTS

| 548,903 | Wood | Oct. 29, 1895 |
| 1,585,660 | Frampton | May 25, 1926 |
| 2,460,190 | Petroff et al. | Jan. 25, 1949 |
| 2,767,474 | Schmitt | Oct. 23, 1956 |